W. G. LEWI.
SPEED CONTROLLING LEVER.
APPLICATION FILED MAY 14, 1914.
1,145,074.
Patented July 6, 1915.
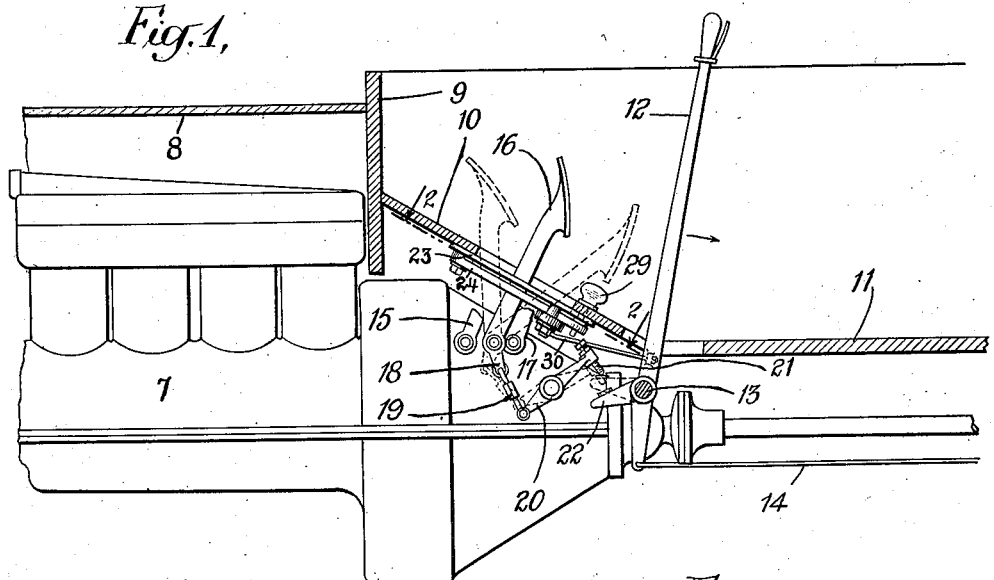
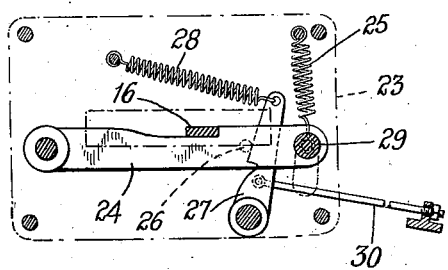
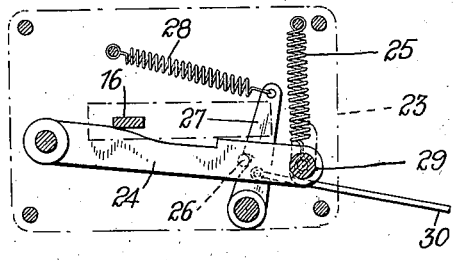
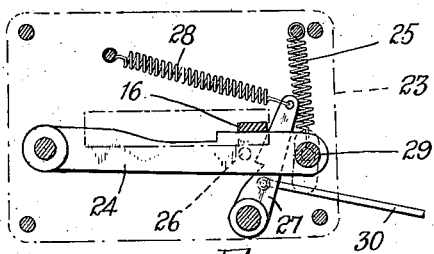
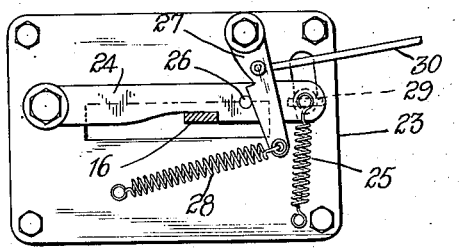
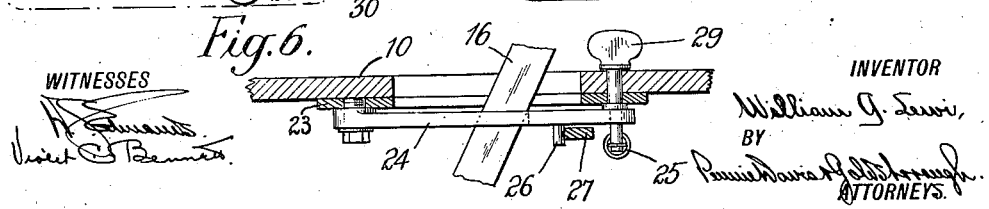
WITNESSES
INVENTOR
William G. Lewi,
BY
ATTORNEYS.

UNITED STATES PATENT OFFICE.

WILLIAM G. LEWI, OF ALBANY, NEW YORK.

SPEED-CONTROLLING LEVER.

1,145,074. Specification of Letters Patent. Patented July 6, 1915.

Application filed May 14, 1914. Serial No. 838,414.

*To all whom it may concern:*

Be it known that I, WILLIAM G. LEWI, a citizen of the United States, residing in the city and county of Albany and State of New York, have invented certain new and useful Improvements in Speed-Controlling Levers; and I do hereby declare the following to be a full, clear, and exact description of the invention, such as will enable others skilled in the art to which it appertains to make and use the same.

This invention relates to controlling mechanism for self-propelled vehicles, particularly controlling mechanism of the type employing a lever, such as a foot pedal, which is movable in either of two opposite directions from a neutral position to positions for operating the vehicle at predetermined speeds.

The invention is of particular utility in automobiles of the type commonly known as the Ford.

In automobiles of the Ford type, the forward running of the vehicle is controlled by a foot pedal which may assume any one of three positions, namely, a neutral position wherein the clutch of the vehicle is disengaged, forward position wherein the low speed gearing is made effective, and a rearward position wherein the high speed gearing is made effective. This controlling lever is actuated by a spring so that when it is released by the foot and by the other mechanism coacting with the lever, it will move to the high speed position.

One of the objects of the present invention is to provide mechanism for coaction with this speed-controlling lever, adapted to define the neutral or intermediate position of the lever so that the operator will experience less difficulty in moving the lever to the neutral position and will know at once when the lever is in that position.

Another object of the invention is to provide mechanism coacting with the speed-controlling lever which will insure operation of the lever in the intended manner, that is, will require that the lever be moved from the neutral to the low speed position before it can be moved to the high speed position. In combination with this mechanism, means are preferably provided whereby the operator, by proceeding in a prescribed manner, can move the speed-controlling lever from the neutral position directly to the high speed position when such direct movement of the speed-controlling lever is desired, as, for instance, when the vehicle has been running down grade with the lever in the neutral position and it is desired to again couple the engine in driving relation to the vehicle.

Another feature of the invention resides in the provision of means for precluding movement of the speed-controlling lever under the influence of the spring coacting therewith from the low speed to the high speed position under predetermined conditions. It sometimes happens that the emergency brake is applied when the speed-controlling lever is in the low speed position, and if the emergency brake were then thrown off, it would be undesirable to have the speed-controlling lever move at once from the low speed or neutral to the high speed position. In accordance with the present invention, means are provided whereby application of the emergency brake causes the speed-controlling lever to be arrested in the neutral position when it is moved from the low speed position by its actuating spring, and to be held in that position even after the emergency brake is released.

A further object of the invention is to provide a mechanism for controlling the operation of the speed-controlling lever in the manner above indicated by apparatus which is simple in construction and which may be manufactured and applied to a car at very low cost.

I have illustrated the preferred embodiment of my invention in the accompanying drawings in which—

Figure 1 is a sectional elevation of a portion of a Ford automobile having my improvements applied thereto; Figs. 2, 3, 4 and 5 are detail views illustrating different positions of the operating parts, Figs. 2, 3, and 4 being in section on line 2—2 of Fig. 1, and Fig. 5 being a view looking upward at the parts shown in Fig. 2; and Fig. 6 is a detail view in vertical section showing certain of the parts which coact with the speed-controlling lever.

Referring to these drawings, 7 indicates the casing of the unit power plant of a Ford car, this being mounted upon the frame of the car and inclosed by a hood 8. The dash is shown at 9 and the floor boards at 10 and 11. The operation of the car is controlled by three foot pedals and a hand lever.

The hand lever is shown at 12 secured upon a transverse rock-shaft 13 and its lower end below the shaft 13 is connected by a rod 14 to the brakes operating upon drums secured to the rear wheels. The three pedals are shown at 15, 16 and 17, these being secured upon rock-shafts which are journaled in bearings formed in the casing 7 of the engine. The pedal 17 is adapted to operate a brake, and pedal 15 controls the position of the clutch. The pedal 16 is the speed-controlling pedal and may assume any one of three positions, the neutral position in which it is shown in full lines in Fig. 1 and the forward and rear positions in which it is shown in dotted lines. The lever 16 is provided with an extension 18 below the shaft on which it is mounted, and this extension is connected by a link 19 to one end of a rocking lever 20, pivotally mounted upon casing 7 and having a screw 21 in its end. This screw 21 is adapted to be engaged by an arm 22 secured to the shaft 13 on which the brake-lever 12 is mounted. When the brake-lever 12 is operated and the speed-controlling lever 16 is in the rear or high speed position, the arm 22 engages the screw 21 and operates through the links 20 and 19 to effect movement of the speed-controlling lever 16 from the high speed to the neutral position of that lever.

Secured to the under side of the floor board 10 is a plate 23 having a slot therein through which the lever 16 extends. A latch or lever 24 is pivotally mounted upon this plate 23 and its free end is connected by a spring 25 to a pin on the plate. This spring 25 tends to turn the lever 24 about its pivot in a direction to cause the edge of the lever to bear against the speed-controlling lever 16. In this edge of the lever 24 is a notch having one straight wall and one inclined wall as shown in Figs. 2 to 5. On the under side of lever 24 is a pin or stud 26 adapted to coact with a notch in one edge of a detent 27 which is pivotally mounted upon the plate 23 and is turned about its pivot by a spring 28 in a direction to cause engagement of the notch and the stud 26.

Fig. 2 shows the parts in their normal positions, the speed-controlling lever 16 being in the neutral position in which it is shown in full lines in Fig. 1. To cause forward movement of the car at the low speed, the lever 16 is pushed forward to the position indicated in Fig. 3 and in so moving it moves along the inclined wall of the notch in lever 24 and turns that lever about its own pivot against the tension of spring 25. As the lever 24 is turned thus, the stud 26 thereon moves along the edge of detent 27 until it comes opposite the notch in the detent, whereupon spring 28 turns detent 27 and the parts assume the positions shown in Fig. 3. It will be seen that the lever 24 is then locked by the detent 27 against movement effected under the influence of spring 25.

If it be desired to propel the car at the high speed, the lever 16 is released and is moved by the spring connected thereto to the opposite end of the slot in plate 23 to the position shown in Fig. 4. In moving to this position, the lever 16 engages the detent 27 and moves the latter against the tension of its spring 28, so as to disengage the notch in detent 27 from the stud 26. When this occurs, the lever 24 is turned slightly about its pivot by spring 25, so that its edge bears against the speed-controlling lever 16. As a result of these movements, if the speed-controlling lever 16 be returned from the high speed to the neutral position, the lever 24 will at once move to the position in which it is shown in Fig. 2 with the speed-controlling lever lying in the notch in the lever 24 and the straight wall of the notch will preclude the movement of the speed-controlling lever 16 from the neutral to the high position.

It will be seen that the lever 24 serves to define the neutral position of the speed-controlling foot pedal 16, by reason of the fact that it is urged by a spring in a direction to cause engagement of its edge with the pedal 16 and this edge is provided with a notch corresponding with the neutral position of the pedal.

The lever 24 also serves to require movement of the pedal 16 in the intended manner. From the neutral position, the pedal can be moved only to the low speed position since movement in the opposite direction to the high speed position is precluded by the straight wall of the notch. After having been moved to the low speed position, the pedal may be moved into the high speed position since at that time, the lever 24 is held in retracted position by the detent 27. Such movement of the pedal 16 causes the release of lever 24 by the detent 27 so that lever 24 will become effective at once when the pedal 16 is moved back to the neutral position. If the emergency brake be actuated when the pedal 16 is in the high speed position, such actuation will result in movement of the pedal 16 back to the neutral position and it will be locked in that position by the notch in lever 24 so that thereafter it can be moved only to the low speed position.

Under certain conditions, it may be desirable to be able to move the pedal 16 from the neutral position direct into the high speed position and I therefore prefer to so arrange the mechanism as to permit the operator to do this by proceeding deliberately in a prescribed manner. This may be accomplished by providing means for moving the lever 24 back to the position in which it is held by the detent 26 otherwise than by means of the pedal 16. For this purpose, a stud 29 is provided upon the floor board 10 movable transversely in a slot in that board. The stem of this stud 29 passes through a slot in the plate 23 and is secured to the free end of lever 24. With the parts in the positions indicated in Fig. 2, the operator may move the stud 29 transversely with his foot and cause it to become latched by the detent 27. The pedal 16 may then be moved directly into the high speed position as shown in Fig. 4.

With the mechanism constructed as so far described, it might occur that the emergency brake would be applied at a time when the pedal 16 was in the low speed position, and the pedal, on being released, would be returned by its spring to the neutral position where it would be arrested by arm 22. If no means were provided to guard against it, the release of the emergency brake thereafter would permit the pedal 16 to move at once to the high speed position. I have therefore, provided a connection between the brake-lever 12 and the detent 27 for the lever 24 such that operation of the lever 12 causes the detent to be retracted as result of which the lever 24 is released and is moved by its spring to its operative position. This connection is shown at 30 extending from the lever 12 to the detent 27. If the lever 12 were operated when the parts are in the Fig. 3 position, the link 30 would retract the detent 27 and spring 25 would move lever 24 to the Fig. 2 position. The release of pedal 16 would allow that pedal to be moved to the neutral position as shown in Fig. 2 where it would be arrested by arm 22 and its movement to the high speed position when brake-lever 12 was released would be precluded by the straight wall of the notch in lever 24.

What I claim as new and desire to secure by Letters Patent of the United States is:

1. In an automobile transmission, a speed-controlling lever movable in a straight line to two operative positions and an intermediate neutral position, means for checking movement of the controlling lever when the latter arrives at the neutral position and means operated by movement of the controlling lever to one of the operative positions for rendering said checking means inoperative to permit movement of the controlling lever to the other of the two operative positions; substantially as described.

2. In an automobile transmission, a speed-controlling lever movable in a straight line to two operative positions and an intermediate neutral position, a lever having a notched edge mounted adjacent to the speed-controlling lever and a spring for pressing the notched lever toward the speed-controlling lever so that the latter will coact with said notch; substantially as described.

3. In an automobile transmission, a speed-controlling lever movable to low speed and high speed positions and an intermediate neutral position, means for requiring movement of said lever from the neutral toward the low speed position before it can be moved to the high speed position; substantially as described.

4. In an automobile transmission, a speed-controlling lever movable to low speed and high speed positions and an intermediate neutral position, a lever having a notched edge mounted adjacent to the speed-controlling lever, a spring for pressing the notched lever toward the speed-controlling lever so that the latter will coact with said notch and a detent for holding the notched lever in retracted position; substantially as described.

5. In an automobile transmission, a speed-controlling lever movable to low speed and high speed positions and an intermediate neutral position, a lever having a notched edge mounted adjacent to the speed-controlling lever, a spring for pressing the notched lever toward the speed-controlling lever so that the latter will coact with said notch and a detent for holding the notched lever in retracted position, said detent extending into the path of movement of the speed-controlling lever so as to be actuated thereby; substantially as described.

6. In an automobile transmission, a speed-controlling lever movable to low speed, high speed and neutral positions, a spring-actuated, notched lever coacting with the speed-controlling lever, a detent for the notched lever, a brake lever and a connection from the brake-lever to said detent; substantially as described.

7. In an automobile transmission, a speed-controlling lever movable to low speed, high speed and neutral positions, a spring-actuated, notched lever coacting with the speed-controlling lever to preclude direct movement from the neutral to the high speed position and means for actuating said last-named lever to move it into position for permitting movement of the speed-controlling lever from the neutral position direct to the high speed position; substantially as described.

In testimony whereof I affix my signature, in presence of two witnesses.

WM. G. LEWI.

Witnesses:
ROBERT C. POSKAUZER,
ELLA ERICKSON.